Figure 1:
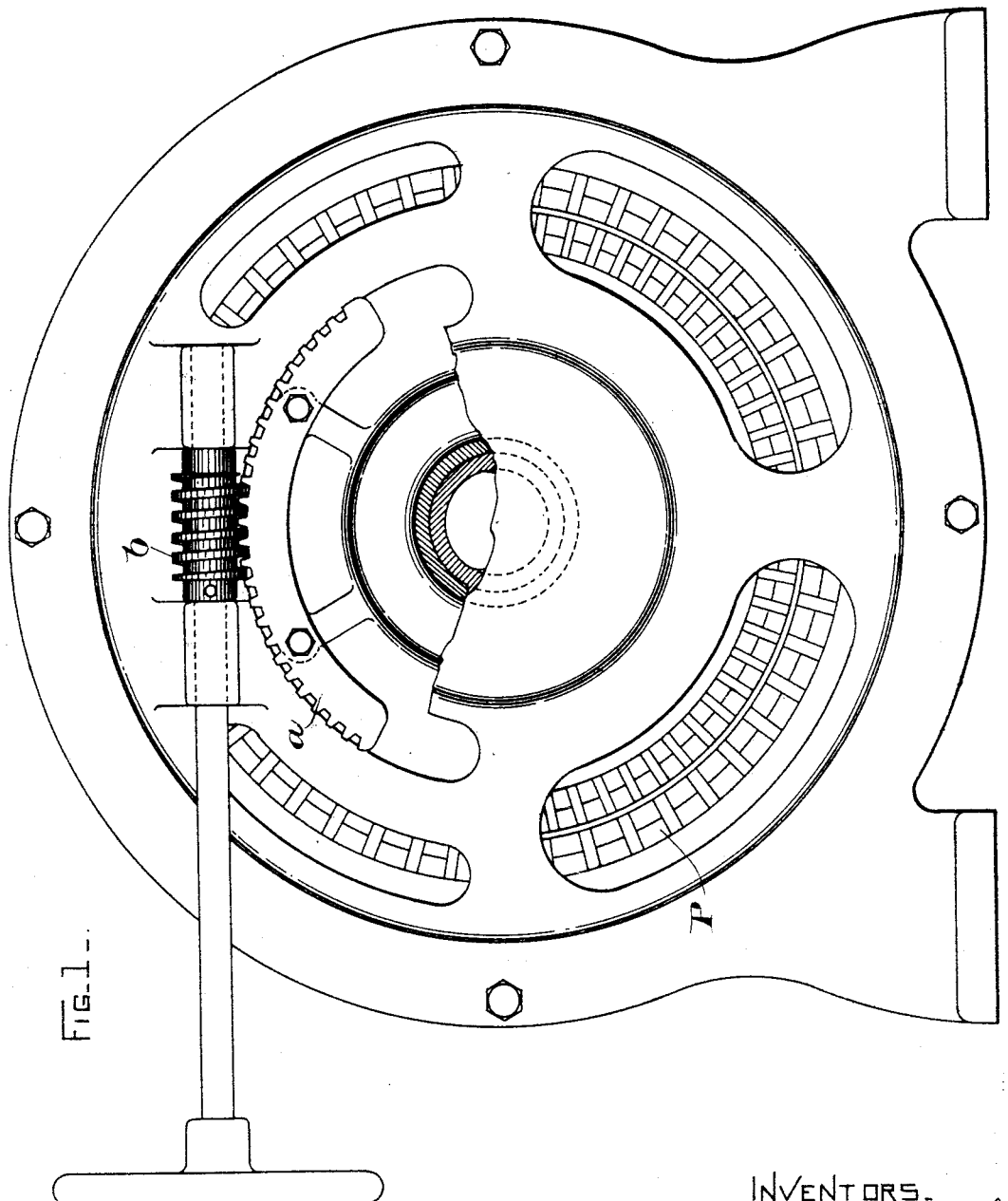

(No Model.) 2 Sheets—Sheet 2.
C. P. STEINMETZ & A. H. ARMSTRONG.
REGULATOR FOR ALTERNATING ELECTRIC CIRCUITS.
No. 542,968. Patented July 16, 1895.
FIG. 2.
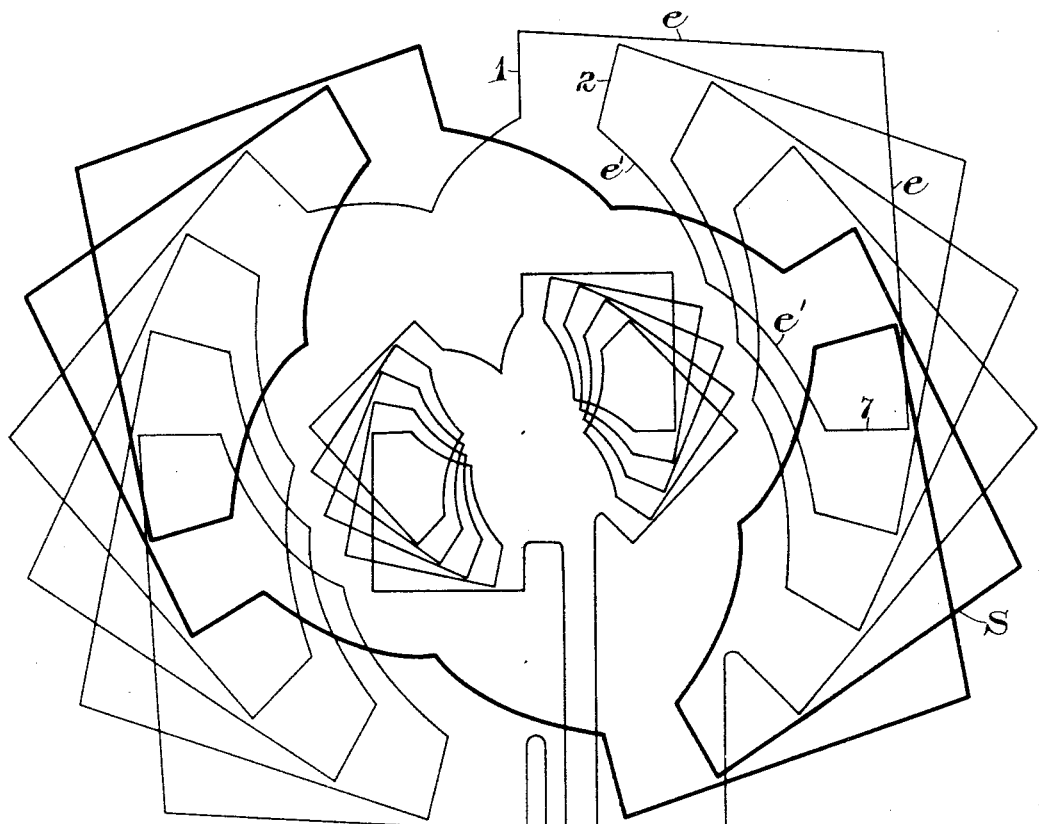
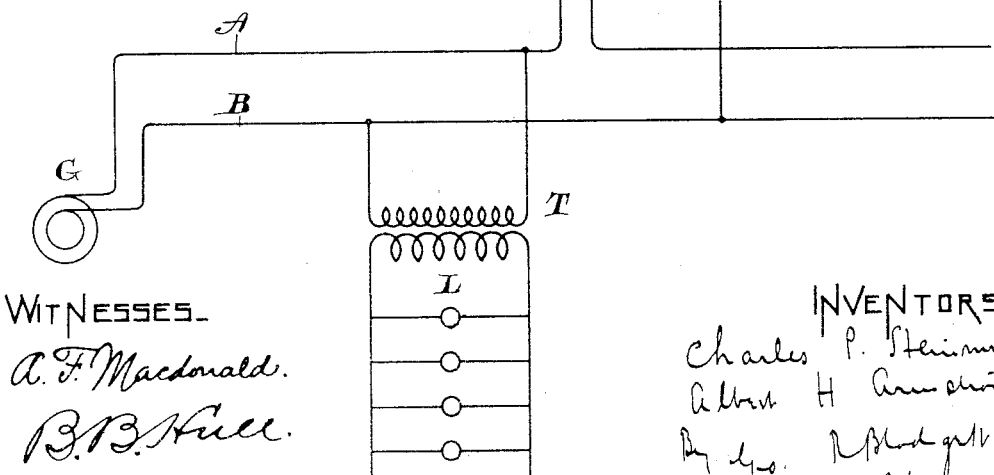
WITNESSES.
A. F. Macdonald.
B. B. Hull.
INVENTORS.
Charles P. Steinmetz
Albert H. Armstrong
By geo. R. Blodgett
Atty.

UNITED STATES PATENT OFFICE.

CHARLES P. STEINMETZ AND ALBERT H. ARMSTRONG, OF SCHENECTADY, NEW YORK, ASSIGNORS TO THE GENERAL ELECTRIC COMPANY, OF SAME PLACE.

REGULATOR FOR ALTERNATING ELECTRIC CIRCUITS.

SPECIFICATION forming part of Letters Patent No. 542,968, dated July 16, 1895.

Application filed February 16, 1895. Serial No. 538,630. (No model.)

*To all whom it may concern:*

Be it known that we, CHARLES P. STEINMETZ, a subject of the Emperor of Germany, and ALBERT H. ARMSTRONG, a citizen of the United States, residing at Schenectady, county of Schenectady, State of New York, have invented certain new and useful Improvements in Regulators for Alternating-Current Circuits, of which the following is a specification.

The present invention relates to an improved apparatus for regulating the potential in alternating-current circuits. It may be used in any alternating circuit whether single-phase or polyphase, so as to raise or lower the potential therein as may be necessary in order to preserve the desired potential at the translating devices. In extended systems of distribution regulators of this description are desirable in the feeders supplying different portions of the system, so as to compensate for variations in the drop of potential in the different feeders which arise from the use of different resistances and the necessity for supplying different amounts of current and other causes now well understood in the art.

The regulator consists in general of a primary or inducing member having an exciting-winding coupled in shunt across the circuit to be regulated and a secondary member having a corresponding winding in series with one of the circuit-mains. The two members of the regulator are then made adjustable with relation to each other, so that the voltage induced in the secondary member may be varied from a maximum amount, assisting the generator voltage to zero, or going even further, the inductance in the secondary member may lower the generator voltage, so that a range of regulation is secured which will be found adequate for practical purposes.

In the drawings, Figure 1 is a view illustrating some of the mechanical parts of the regulator, and Fig. 2 is a diagram showing more particularly the windings of the regulator and the distribution system to which it is applied.

The regulator, Fig. 1, consists of a primary member P, which in practice we have made in a manner resembling the ring-shaped field-frame customarily employed in different forms of alternating generators and motors. Slots for the windings are provided on the inner face of the primary frame, and coils are located in the slots, which are connected in shunt across the circuit to be regulated. The secondary member we usually mount on a shaft after the manner of the armature of an alternating motor, and any suitable mechanism is provided for rotating the secondary member and holding it in any desired position relatively to the primary. For this purpose there is shown a worm-wheel $a$ on the armature-shaft, which is turned by a worm $b$ mounted in the frame of the apparatus. The winding of the secondary member is included in series with one of the mains of the regulated circuit. The arrangement of the windings will be more clearly understood from the diagram Fig. 2, in which G is an alternating generator, from which extend mains or feeders A B. A transformer T is shown for supplying a group of lamps L with current at a reduced potential.

In practice, of course, it will be understood that the distribution system will ordinarily be much more extended than that shown in the drawings, comprising a variety of feeders and often requiring a number of regulators for the different feeder-circuits. Furthermore, while the invention is shown applied to an ordinary single-phase system, it is equally applicable to multiphase systems by properly winding the primary and secondary of the regulator to correspond with the character of the system in a manner well understood in the art.

The regulator may have a two-pole, four-pole, or other winding. Ordinarily we use a four-pole winding, since it avoids the long end connections required for a bipolar winding. The connections of the primary winding will be understood from Fig. 2. Starting, for example, from slot 1, the winding then passes by an end connection $e$ to slot 7, thence by end connection $e'$ back to slot 2, and so on around the primary member, as indicated on the diagram. The secondary member has a similar winding, which is shown in series with the main A. The primary member also has a short-circuited winding S, arranged in slots in the same manner as the primary winding, but ninety degrees displaced with reference to the polar faces. When the secondary member stands in the position shown, its conductors are cut by a maximum number of lines and the boosting effect upon the voltage in the circuit will consequently be a maximum. In this position the short-circuited coil is practically idle. By turning the armature in one direction or the other the inductive effect becomes less and less great until the secondary windings cut no lines of force, when the boosting effect of the regulator upon the potential in the circuit will have disappeared. In the position last assumed the lines induced by the armature-current become closed through the short-circuited winding, so as to cut down to a greater or less extent the self-induction of the winding and its reactance.

Various adjustments may be given the apparatus. It may be arranged to raise the voltage in the external circuit to a greater or less degree under varying conditions of load, or it may act as a reactance of varying amount, or for some loads it may serve as a reactance and on other loads as a means of raising the generator voltage. All of these various methods of designing or adjusting the apparatus will be well understood by engineers.

What we claim as new, and desire to secure by Letters Patent of the United States, is—

1. The combination in a regulator for alternating current circuits of a primary or inducing member having a winding coupled in shunt across the regulated circuit, an induced or secondary member having a corresponding winding in series with one of the circuit mains, and means for adjusting the two members so that the field and armature poles may stand at a desired angle to one another, as set forth.

2. The combination in a regulator for alternating circuits, of an inducing member having a face winding coupled in shunt across the circuit, with an armature mounted on a central shaft having a corresponding winding in series with one of the circuit mains, and means for rotating the armature so that its poles may stand at any desired angle to the field poles, as set forth.

3. The combination in a regulator for alternating current circuits, of a field winding coupled in shunt across the circuit, an armature winding in series with one of the mains, a short-circuited winding upon the primary member for neutralizing the self induction in the armature, and means for adjusting the relative positions of the primary and secondary members, as set forth.

In witness whereof we have hereunto set our hands this 14th day of February, 1895.

CHARLES P. STEINMETZ.
ALBERT H. ARMSTRONG.

Witnesses:
B. B. HULL,
A. F. MACDONALD.